(12) United States Patent
Han et al.

(10) Patent No.: US 10,805,601 B2
(45) Date of Patent: Oct. 13, 2020

(54) MULTIVIEW IMAGE DISPLAY DEVICE AND CONTROL METHOD THEREFOR

(71) Applicant: SAMSUNG ELECTRONICS CO., LTD., Suwon-si (KR)

(72) Inventors: Seung-ryong Han, Yongin-si (KR); Jong-sul Min, Hwaseong-si (KR); Jin-sung Lee, Suwon-si (KR); Ho-young Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 184 days.

(21) Appl. No.: 15/514,572

(22) PCT Filed: Jul. 22, 2015

(86) PCT No.: PCT/KR2015/007614
§ 371 (c)(1),
(2) Date: Mar. 27, 2017

(87) PCT Pub. No.: WO2016/056735
PCT Pub. Date: Apr. 14, 2016

(65) Prior Publication Data
US 2017/0230647 A1 Aug. 10, 2017

(30) Foreign Application Priority Data

Oct. 10, 2014 (KR) .................. 10-2014-0136549

(51) Int. Cl.
*H04N 13/111* (2018.01)
*H04N 13/351* (2018.01)
(Continued)

(52) U.S. Cl.
CPC ......... *H04N 13/351* (2018.05); *H04N 13/111* (2018.05); *H04N 13/305* (2018.05);
(Continued)

(58) Field of Classification Search
CPC .... H04N 13/305; H04N 13/324; H04N 13/31; H04N 13/317; H04N 13/398; H04N 13/111; H04N 13/351; H04N 13/04
See application file for complete search history.

(56) References Cited

U.S. PATENT DOCUMENTS 7,777,757 B2  8/2010  Allio
7,834,903 B2  11/2010 Saishu et al.
(Continued)

FOREIGN PATENT DOCUMENTS

CN   103916655 A   7/2014
EP   2 753 086 A2  7/2014
(Continued)

OTHER PUBLICATIONS

Communication dated Aug. 17, 2018, issued by the Korean Intellectual Property Office in corresponding Korean Application No. 10-2014-0136549.
(Continued)

*Primary Examiner* — Dave Czekaj
*Assistant Examiner* — Berteau Joisil
(74) *Attorney, Agent, or Firm* — Sughrue Mion, PLLC

(57) ABSTRACT

A multiview image display device is disclosed. The multiview image display device comprises: an image input unit for receiving an image; a rendering unit for rendering a plurality of views of different visual views on the basis of the depth of the inputted image; a display unit for displaying a multiview image generated on the basis of a pixel value constituting the plurality of views; and a control unit for generating the multiview image by mapping, to at least one target pixel area, a mixed pixel value obtained based on the pixel value of a specific visual view and the pixel value of a visual view adjacent to the specific visual view among the plurality of views.

15 Claims, 17 Drawing Sheets

(51) Int. Cl.
*H04N 13/317* (2018.01)
*H04N 13/305* (2018.01)
*H04N 13/324* (2018.01)
*H04N 13/31* (2018.01)
*H04N 13/398* (2018.01)

(52) U.S. Cl.
CPC ........... *H04N 13/31* (2018.05); *H04N 13/317* (2018.05); *H04N 13/324* (2018.05); *H04N 13/398* (2018.05)

(56) References Cited

U.S. PATENT DOCUMENTS

| | | | |
|---|---|---|---|
| 8,872,904 B1* | 10/2014 | Hwang | G02B 27/2214 348/54 |
| 9,177,411 B2 | 11/2015 | Hwang et al. | |
| 2011/0102423 A1* | 5/2011 | Nam | H04N 13/305 345/419 |
| 2012/0019516 A1 | 1/2012 | Park et al. | |
| 2012/0139911 A1 | 6/2012 | Saishu et al. | |
| 2012/0268499 A1* | 10/2012 | Izumi | H04N 13/261 345/682 |
| 2012/0274630 A1 | 11/2012 | Lin | |
| 2013/0058563 A1 | 3/2013 | Yoshida | |
| 2014/0071253 A1 | 3/2014 | de la Barre et al. | |
| 2014/0091991 A1* | 4/2014 | An | G09G 5/14 345/32 |
| 2014/0192044 A1 | 7/2014 | Hwang et al. | |

FOREIGN PATENT DOCUMENTS

| | | | |
|---|---|---|---|
| JP | 200586414 A | 3/2005 | |
| JP | 2012093666 A | 5/2012 | |
| KR | 1020120062477 A | 6/2012 | |
| KR | 1020120068126 A | 6/2012 | |
| KR | 10-2012-0095136 A | 8/2012 | |
| KR | 1020130014544 A | 2/2013 | |
| KR | 101297249 B1 | 8/2013 | |
| KR | 1020140022882 A | 2/2014 | |
| KR | 1020140035065 A | 3/2014 | |
| KR | 1020140089860 A | 7/2014 | |

OTHER PUBLICATIONS

Communication dated Jan. 11, 2018 by the State Intellectual Property Office of P.R. China in counterpart Chinese Patent Application No. 201580054990.X.

Communication issued by the European Patent Office dated Aug. 16, 2017 in counterpart European Patent Application No. 15848701.7.

Tobias Gurdan et al., "Spatial and Temporal Interpolation of Multi-View Image Sequences", Network and Parallel Computing, Sep. 2-5, 2014, pp. 1-12, vol. 8753, XP055395769.

International Search Report dated Nov. 18, 2015, issued by the International Searching Authority in counterpart International Application No. PCT/KR2015/007614 (PCT/ISA/210).

Written Opinion dated Nov. 18, 2015, issued by the International Searching Authority in counterpart International Application No. PCT/KR2015/007614 (PCT/ISA/237).

Communication dated Jan. 9, 2019, issued by the Korean Intellectual Property Office in corresponding Korean Application No. 10-2014-0136549.

Communication dated Apr. 12, 2019, issued by the European Patent Office in counterpart European Application No. 15848701.7.

* cited by examiner

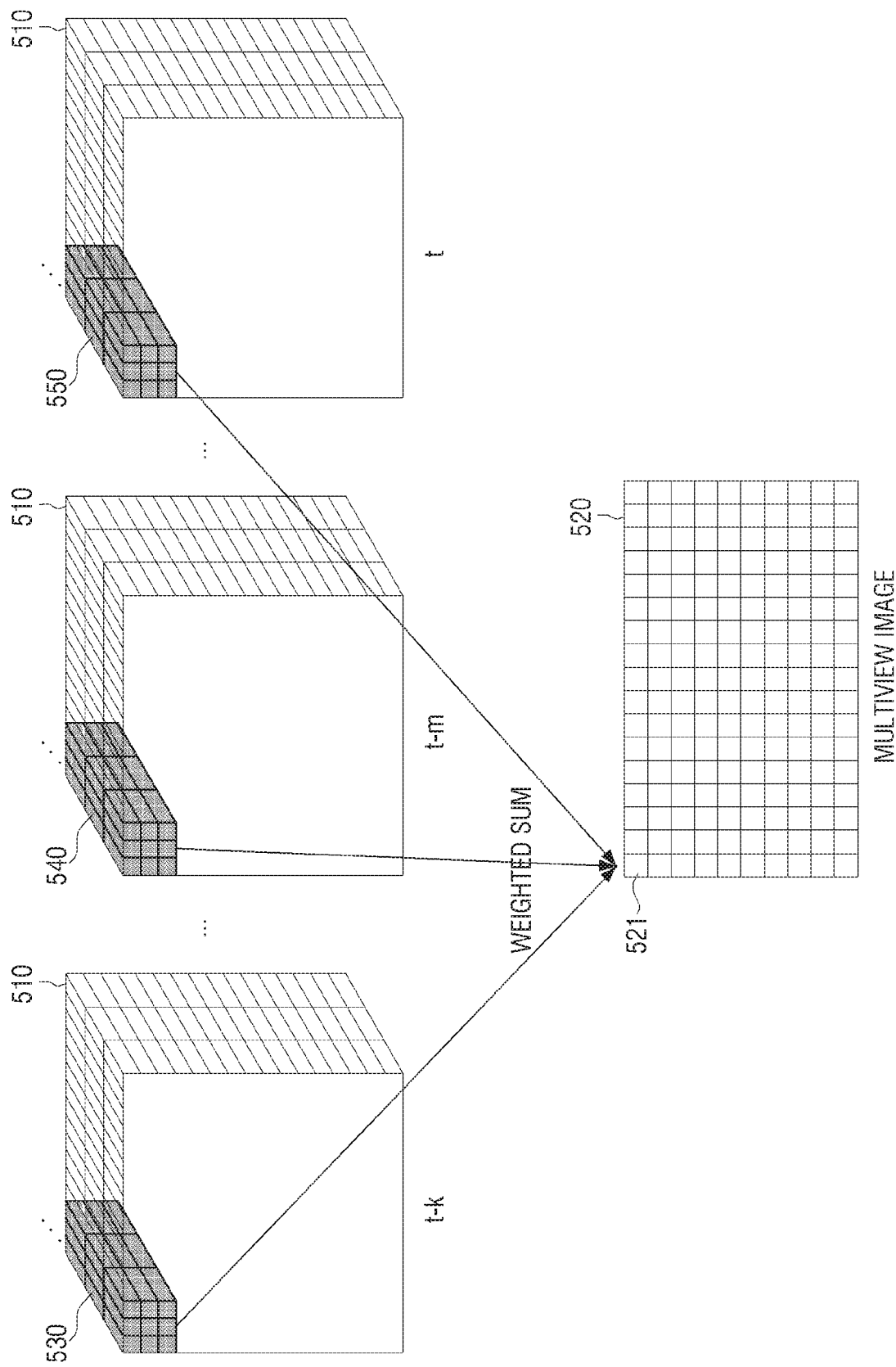

MULTIVIEW IMAGE DISPLAY DEVICE AND CONTROL METHOD THEREFOR

This application is a National stage entry of International Application No. PCT/KR2015/007614, filed on Jul. 22, 2015, which claims priority from Korean Patent Application No. 10-2014-0136549, filed on Oct. 10, 2014 in the Korean Intellectual Property Office. The disclosures of each of the applications are herein incorporated by reference in their entirety.

FIELD OF THE INVENTION

Apparatuses and methods consistent with the present disclosure relate to a multiview image display device and a control method therefor, and more particularly, to an autostereoscopic multiview image display device and a control method therefor.

DESCRIPTION OF THE RELATED ART

In accordance with a development of an electronic technology, various types of electronic devices have been developed and spread. In particular, a display device such as a TV, which is one of home appliances which are used most commonly in a normal home, has been rapidly developed in recent years.

As performance of the display device is improved, the kind of contents displayed on the display device has also been variously increased. In particular, a three-dimensional (3D) display system by which 3D contents may also be viewed has been recently developed and spread.

The 3D display device may be implemented as a 3D television used in the normal home as well as various types of display devices such as a variety of monitors, cellular phones, PDAs, PCs, set-top PCs, tablet PCs, electronic frames, kiosks, and the like. Further, a 3D display technology may be used in the home and may be utilized in various fields that require a 3D imaging, such as science, medicine, design, education, advertisement, computer game, etc.

A 3D display system may be mainly classified into an autostereoscopic system that is viewable without glasses and a stereoscopic system that may be viewed by wearing the glasses.

The stereoscopic system had inconvenience that it may provide satisfactory 3D effect, but a viewer must use the glasses. In comparison, since the autostereoscopic system has an advantage that it may view a 3D image without the glasses, the development on the autostereoscopic system is continuously discussed.

Meanwhile, a conventional autosteroscopic system had a problem that there are obstacles in providing a clear 3D image such as a discontinuous view transition because the number of optical views provided from a viewing zone of a user and the number of received image views used to generate a multiview image are equal to each other.

DETAILED DESCRIPTION OF THE INVENTION

Technical Task

The present disclosure provides a multiview image display device that provides a clear 3D image by generating a multiview image using more received image views than the number of optical views, and a control method therefor.

Means to Resolve the Technical Task

According to an aspect of the present disclosure, a multiview image display device includes an image receiver receiving an image; a renderer rendering a plurality of views of different viewpoints based on a depth of the received image; a display displaying a multiview image generated based on pixel value configuring the plurality of views; and a controller generating the multiview image by mapping a mixed pixel value obtained based on a pixel value of a view of a specific viewpoint and pixel values of view of adjacent viewpoint of the view of the specific viewpoint among the plurality of views, to at least one target pixel zone.

The display may include a display panel displaying the multiview image, and a visual field separator disposed in a front surface of the display panel and providing optical views of different viewpoints in a viewing zone of a user, and the number of the plurality of views used to generate the multiview may be greater than the number of the optical views.

The controller may calculate the mixed pixel value by selecting the view of the specific viewpoint to be mapped to the target pixel zone according to a predetermined reference, setting a source pixel zone corresponding to the target pixel zone in the selected view of the specific viewpoint and the views of the adjacent viewpoints of the view of the specific viewpoint, and then applying a predetermined weight to the set source pixel zone.

The controller may set a pixel zone including a pixel zone corresponding to the target pixel zone in the selected view of the specific viewpoint and the views of the adjacent viewpoints and adjacent pixel zones of the pixel zone, as the source pixel zone.

The controller may calculate the mixed pixel value by setting a three-dimensional (3D) zone including the source pixel zone corresponding to each of the selected view of the specific viewpoint and the views of the adjacent viewpoints in an epipolar domain generated based on an epipolar image configured by the same pixel line of each of the plurality of views, and applying a predetermined weight to the set 3D zone.

The controller may calculate the mixed pixel value to which the predetermined weight is applied by applying a predetermined filter to the 3D zone.

The predetermined filter may be a bilinear interpolation filter.

The views of the adjacent viewpoints of the view of the specific viewpoint used to calculate the mixed pixel value may include a view of a previous viewpoint and a view of a next viewpoint of the view of the specific viewpoint.

The controller may calculate the mixed pixel value in one sub-pixel unit among red (R), green (G), and blue (B).

According to another aspect of the present disclosure, a control method of a multiview image display device includes rendering a plurality of views of different viewpoints based on a depth of a received image; generating a multiview image based on pixel values configuring the plurality of rendered views; and displaying the generated multiview image, wherein in the generating of the multiview image, the multiview image is generated by mapping a mixed pixel value obtained based on a pixel value of a view of a specific viewpoint and pixel value of view of adjacent viewpoint of the view of the specific viewpoint among the plurality of views, to at least one target pixel zone.

The display device may include a display panel displaying the multiview image, and a visual field separator disposed in a front surface of the display panel and providing optical views of different viewpoints in a viewing zone of a user, and the number of the plurality of views used to generate the multiview may be greater than the number of the optical views.

In the generating of the multiview image, the mixed pixel value may be calculated by selecting the view of the specific viewpoint to be mapped to the target pixel zone according to a predetermined reference, setting a source pixel zone corresponding to the target pixel zone in the selected view of the specific viewpoint and the views of the adjacent viewpoints of the view of the specific viewpoint, and then applying a predetermined weight to the set source pixel zone.

In the generating of the multiview image, a pixel zone including a pixel zone corresponding to the target pixel zone in the selected view of the specific viewpoint and the views of the adjacent viewpoints and adjacent pixel zones of the pixel zone may be set as the source pixel zone.

In the generating of the multiview image, the mixed pixel value may be calculated by setting a three-dimensional (3D) zone including the source pixel zone corresponding to each of the selected view of the specific viewpoint and the views of the adjacent viewpoints in an epipolar domain generated based on an epipolar image configured by the same pixel line of each of the plurality of views, and applying a predetermined weight to the set 3D zone.

In the generating of the multiview image, the mixed pixel value to which the predetermined weight is applied may be calculated by applying a predetermined filter to the 3D zone.

The predetermined filter may be a bilinear interpolation filter.

In the generating of the multiview image, the mixed pixel value may be calculated by applying the predetermined weight to the 3D zone set in each of a plurality of adjacent frames which are temporally adjacent to each other.

The views of the adjacent viewpoints of the view of the specific viewpoint used to calculate the mixed pixel value may include a view of a previous viewpoint and a view of a next viewpoint of the view of the specific viewpoint.

In the generating of the multiview image, the mixed pixel value may be calculated in one sub-pixel unit among red (R), green (G), and blue (B).

Effect of the Invention

According to the diverse exemplary embodiments of the present disclosure, it is possible to improve image quality of the 3D image provided by the autostereoscopic display system.

BRIEF DESCRIPTION OF THE DRAWING FIGURES

The above and/or other aspects of the present disclosure will be more apparent by describing certain exemplary embodiments of the present disclosure with reference to the accompanying drawings, in which:

FIGS. 5A to 5D are diagrams illustrating a pixel mapping method using an epipolar domain according to an exemplary embodiment of the present disclosure;

DETAILED DESCRIPTION OF THE EXEMPLARY EMBODIMENTS

Hereinafter, diverse exemplary embodiments of the present disclosure will be described in detail with reference to the accompanying drawings.

Figure 1:
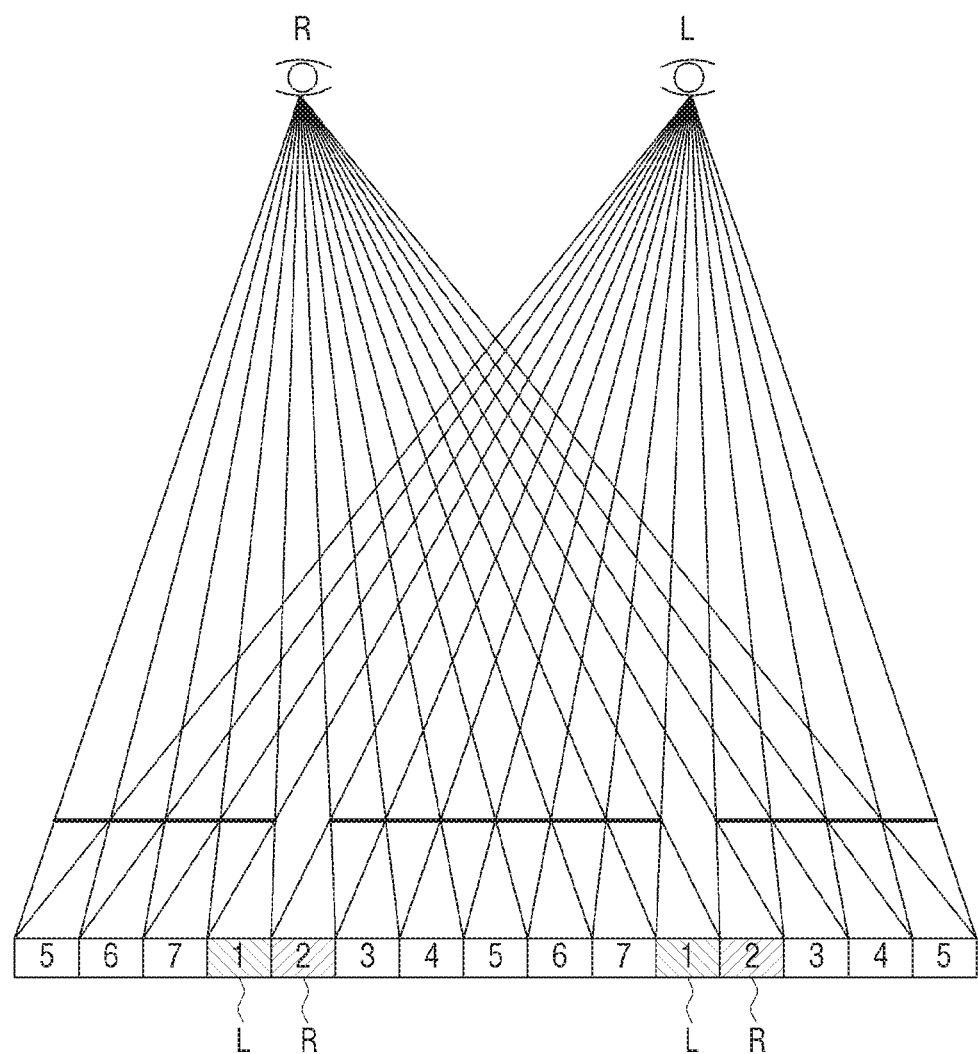
FIG. 1 is a diagram illustrating an operation of a multiview image display device for facilitating understanding of the present disclosure.

FIG. 1 is a diagram illustrating an operation of a multiview image display device for facilitating understanding of the present disclosure.

FIG. 1 illustrates an operation scheme of a device that displays a multiview image and provides a three-dimensional (3D) image in an autostereoscopic scheme according to an exemplary embodiment of the present discourse, where the multiview image may be generated based on a plurality of images obtained by photographing the same object at different angles. That is, an image in which the plurality of images photographed at different viewpoints are refracted at different angels and are focused to a position (e.g., about 3 meters) spaced apart by a predetermined distance which is referred to as a so-called viewing distance is provided. A position at which such image is formed is referred to as a viewing zone (or an optical view). Accordingly, when one eye of a user is positioned at a first viewing zone and the other eye is positioned at a second viewing zone, the user may feel a 3D effect.

As an example, FIG. 1 is a diagram illustrating a display operation of a multiview image having a total of 7 viewpoints. Referring to FIG. 1, an autostereoscopic 3D display device may project light corresponding to an image of a viewpoint 1 of the 7 viewpoints to a left eye and light corresponding to an image of a viewpoint 2 of the 7 viewpoints to a right eye. Accordingly, since the user views images having different viewpoints at the left eye and the right eye, the user may feel the 3D effect.

Figure 2A:
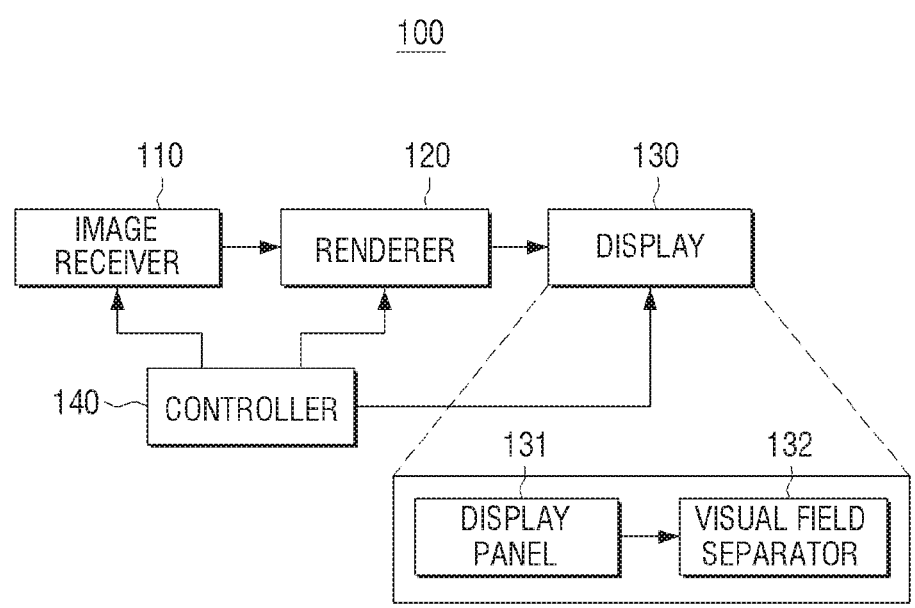
FIGS. 2A to 2C are diagrams illustrating configurations of a multiview image display device according to an exemplary embodiment of the present disclosure.
Figure 2B:
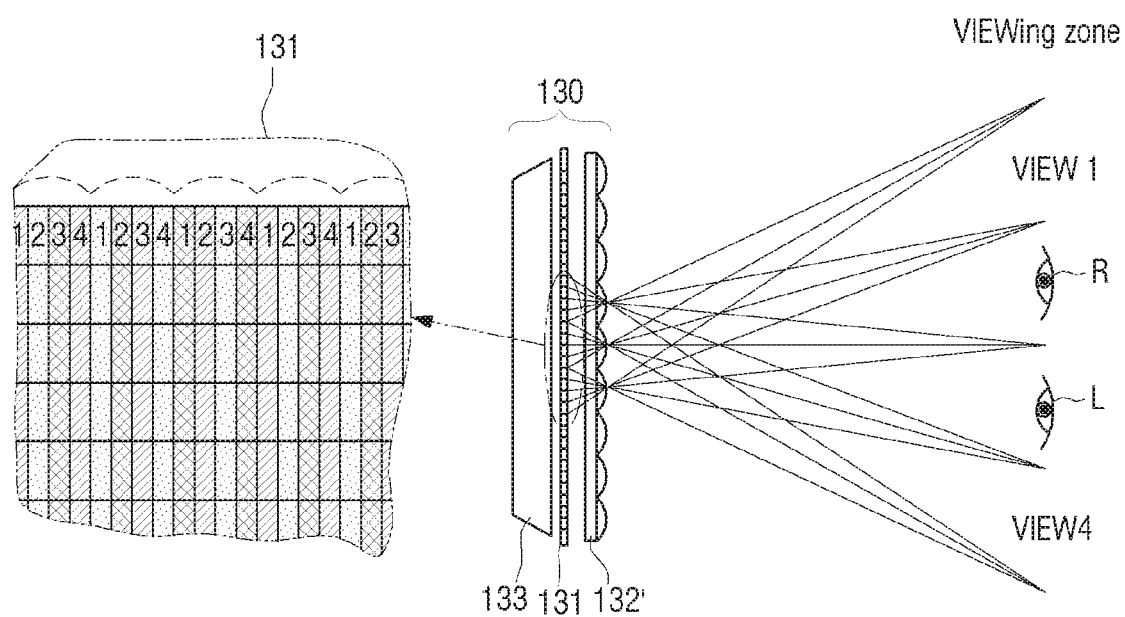
Figure 2C:
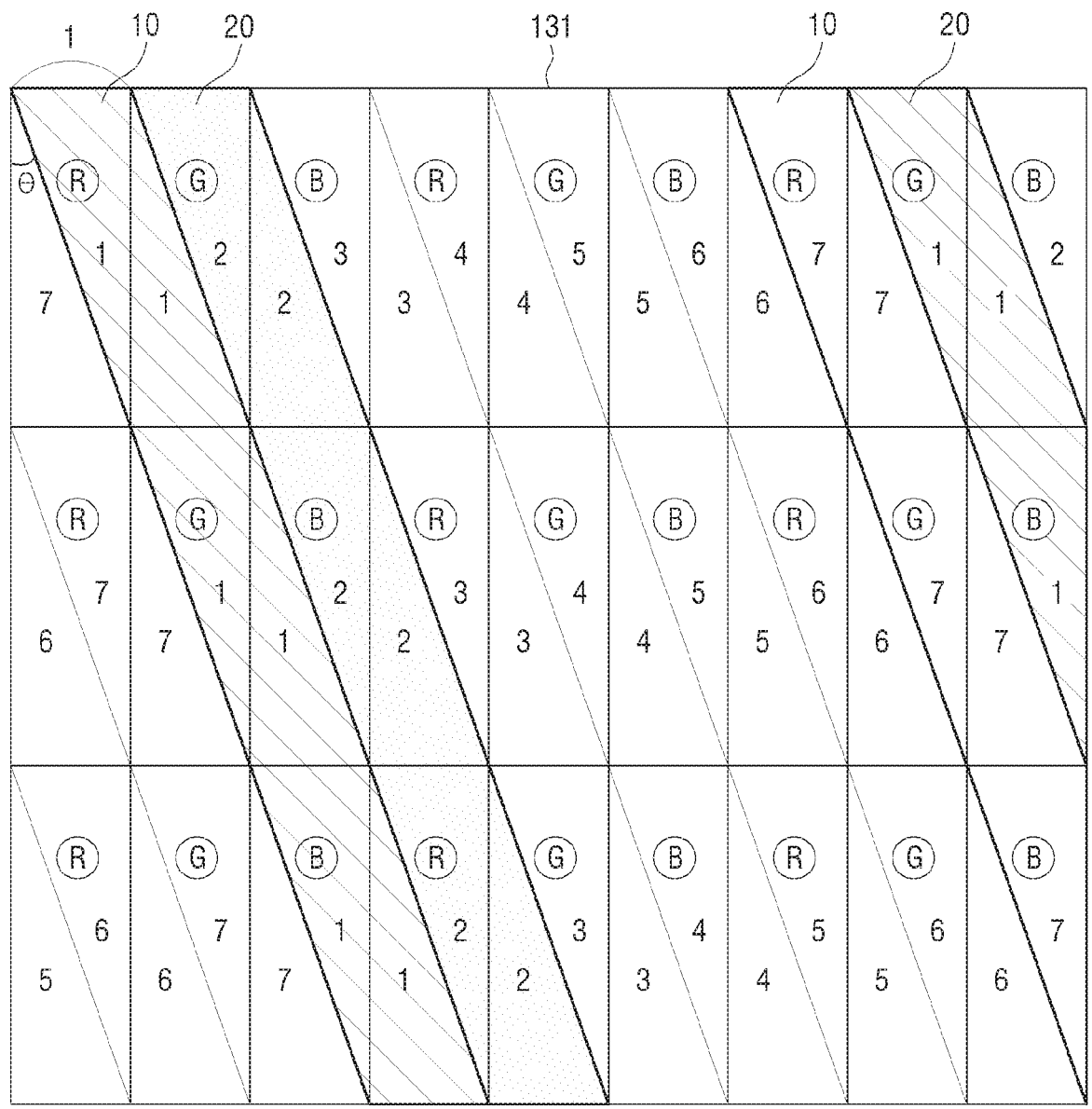

FIGS. 2A to 2C are diagrams illustrating configurations of a multiview image display device according to an exemplary embodiment of the present disclosure.

FIG. 2A is a block diagram illustrating a configuration of a multiview image display device according to an exemplary embodiment of the present disclosure.

Referring to FIG. 2A, a multiview image display device 100 includes an image receiver 110, a renderer 120, a display 130, and a controller 140.

The multiview image display device 100 may be implemented as various kinds of display devices such as a TV, a monitor, a PC, a kiosk, a tablet PC, an electronic frame, a cell phone, and the like.

An image receiver 110 receives an image. Specifically, the image receiver 110 may receive the image from a variety of external devices such as an external storage medium, a broadcasting station, a web server, and the like. Here, the received image is any one image of a single viewpoint image, a stereo image, and a multiview image. The single viewpoint image is an image photographed by a general photographing device, and the stereoscopic image, which is a 3D video image expressed by only a left eye image and a right eye image, is a 3D image photographed by a stereo photographing device. In general, the stereo photographing device is a photographing device including two lenses and is used for photographing the 3D image. In addition, the multiview image means the 3D video image that provides various viewpoints in several directions to the user by geometrically correcting images photographed by one or more photographing devices and spatially synthesizing the images.

In addition, the image receiver 110 may receive depth information of the image. In general, the depth of the image is a depth value assigned to each of pixels of the image. As an example, the depth of 8 bits may have grayscale values of 0 to 255. For example, on the basis of black and white, the black (a low value) may represent a position which is distant from the viewer and the white (a high value) may represent a position which is close to the viewer.

The depth information, which is information representing the depth of the 3D image, is information corresponding to a binocular parallax degree between the left eye image and the right eye image configuring the 3D image. Depending on the depth information, a degree of 3D effect felt by human is changed. That is, in the case in which the depth is large, since the binocular parallax between the left and right eyes is large, the human feels a relative large 3D effect, and in the case in which the depth is small, since the binocular parallax between the left and right eyes is small, the human feels a relative small 3D effect. The depth information may be generally obtained by a passive method using only two-dimensional characteristics of the image such as a stereo matching and an active method using an equipment such as a depth camera. Meanwhile, the depth information may have a depth map form. A depth map means a table including the depth information for each of zones of the image. The zone may also be classified in a pixel unit and may also be defined as a predetermined zone greater than the pixel unit. According to one example, the depth map may have a form in which values smaller than 127 or 128 are represented as a negative (−) value and values greater than 127 or 128 are represented as a positive (+) value, based on 127 or 128 of the grayscale values of 0 to 255 as a reference value, that is, 0 (or a focal plane). A reference value of the focal plane may be arbitrarily selected between 0 and 255. Here the negative (−) value means a depression, and the positive (+) value means a protrusion.

The renderer 120 may render a plurality of views having different viewpoints.

Specifically, the renderer 120 may render the plurality of views having the different viewpoints based on the depth information extracted from a 2D/3D conversion in the case of a 2D image. Alternatively, when N views having different viewpoints and N depth information corresponding to the N views are input, the renderer 120 may render the multiview image based on at least one image and depth information of the input N views and depth information. Alternatively, when only the N views having different viewpoints are input, the renderer 120 may extract the depth information from the N views and then render the multiview image based on the extracted depth information.

As an example, the renderer 120 may select the 3D image, i.e., one of the left eye image and the right eye image as a reference view (or a center view) to generate the leftmost view and the rightmost view that are the basis of the multiview image. In this case, the renderer 120 may generate the leftmost view and the rightmost view on the basis of corrected depth information corresponding to one of the left eye image and the right eye image, which is selected as the reference view. When the leftmost view and the rightmost view are generated, the renderer 120 may render the multiview image by generating a plurality of interpolation views between the center view and the leftmost view and generating a plurality of interpolation views between the center view and the rightmost view. However, the renderer 120 is not limited thereto, but may also generate an extrapolation view which is generated by an extrapolation method. Meanwhile, in the case in which the multiview image is rendered based on the 2D image and the depth information, the 2D image may also be selected as the center view.

However, the detailed operation of the renderer 120 described above is merely one example, and the renderer 120 may also render the plurality of views by various methods other than the operation described above.

Meanwhile, although not illustrated in the drawings, the multiview image display device 100 may further include a depth adjuster (not shown) that adjusts the depth of the image input based on the depth information according to various references, and in this case, the renderer 120 may render the plurality of views based on the image of which the depth is adjusted by the depth adjuster (not shown).

The display 130 functions to provide a plurality of optical views (or viewing zones). To this end, the display 130 includes a display panel 131 and a visual field separator 132 for providing the plurality of optical views.

The display panel 131 includes a plurality of pixels including a plurality of sub-pixels. Here, the sub-pixel may include red (R), green (G), and blue (B). That is, the pixel including the sub-pixels of R, G, and B may be arranged in a plurality of row and column directions to configure the display panel 131. In this case, the display panel 131 may be implemented in various display units such as a liquid crystal display (LCD) panel, a plasma display panel (PDP), an organic light emitting diode (OLED), a vacuum fluorescent display (VFD), a field emission display (FED), an electro luminescence display (ELD), and the like.

The display panel 131 displays an image frame. Specifically, the display panel 131 may display a multiview image frame in which a plurality of views having different viewpoints are sequentially and repeatedly arranged.

Meanwhile, although not illustrated in FIG. 2A, in the case in which the display panel 131 is implemented in the LCD panel, the display device 100 may further include a backlight unit (not shown) that supplies a backlight to the display panel 131 and a panel driver (not shown) that drives the pixels of the display panel 131 according to a pixel value of each of the pixels configuring the image frame.

The visual field separator 132 may be disposed on a front surface of the display panel 131 to provide different viewpoints, that is, the optical views, for each of the viewing zones. In this case, the visual field separator 132 may be implemented in a lenticular lens or a parallax barrier.

For example, the visual field separator 132 may be implemented in the lenticular lens including a plurality of lens zones. Accordingly, the lenticular lens may refract an image displayed on the display panel 131 by the plurality of lens zones. Each of the lens zones may be formed in a size corresponding to at least one pixel to disperse light transmitting each pixel to be different for each of the viewing zones.

As another example, the visual field separator 132 may be implemented in the parallax barrier. The parallax barrier is implemented in a transparent slit array including a plurality of barrier zones. Accordingly, the visual field separator 132 may block light by a slit between the barrier zones to allow the images having different viewpoints for each of the viewing zones to be emitted.

FIG. 2B describes a case in which the visual field separator 132 is implemented in the lenticular lens array according to an exemplary embodiment of the present disclosure, by way of example.

Referring to FIG. 2B, the display 130 includes the display panel 131, a lenticular lens array 132', and the backlight unit 133.

Referring to FIG. 2B, the display panel 131 includes a plurality of pixels which are classified in a plurality of columns. Images having different viewpoints are disposed for each of the columns. Referring to FIG. 2C, a form in which a plurality of images 1, 2, 3, and 4 having different viewpoints are sequentially and repeatedly disposed is illustrated. That is, the respective pixel columns are arranged in groups numbered as 1, 2, 3, and 4. Graphic signals applied to the panel are arranged so that a pixel column 1 displays a first image and a pixel column 2 displays a second image.

The backlight unit 133 provides light to the display panel 131. The respective images 1, 2, 3, and 4 formed on the display panel 131 by the light provided from the backlight unit 133 are projected to the lenticular lens array 132', and the lenticular lens array 132' disperses light of the respective projected images 1, 2, 3, and 4 to transfer the light in a direction of the viewer. That is, the lenticular lens array 132' generates exit pupils at a position of the viewer, that is, a viewing distance. As illustrated, a thickness and a diameter of the lenticular lens in the case in which the visual field separator 132 is implemented in the lenticular lens, an interval between the slits in the case in which the visual field separator 132 is implemented in the parallax barrier, and the like may be designed so that the exit pupils generated by the respective columns are separated by an average binocular center distance which is less than 65 mm. The separated image lights each form the viewing zones. That is, as illustrated in FIG. 2B, in the case in which first to fourth views are formed and the left eye and the right eye of the user are positioned at the second view and the third view, respectively, the user may view the 3D image.

Meanwhile, the visual field separator 132 may be operated to be tilted at a predetermined angle in order to improve image quality. The controller 140 may generate the multiview image frame for an output by dividing each of the plurality of views rendered by the renderer 120 based on the angle at which the visual field separator 132 is tilted, and combining the divided views. Accordingly, the user may not view an image displayed in a vertical direction or a horizontal direction with respect to the sub-pixel of the display panel 131, but may view a zone tilted in a specific direction. Accordingly, the viewer may view a portion of each of the sub-pixels rather than one complete sub-pixel. For example, when it is assumed that a total of 7 viewpoints are provided, an output image may be rendered so that at least some of the plurality of sub-pixels each output pixel values corresponding to the plurality of views as illustrated in FIG. 2C. In this case, in the case in which the right eye of the viewer views an image of a viewpoint 1 and the left eye views an image of a viewpoint 2, the right eye of the viewer may view a tilted zone 10 corresponding to the viewpoint 1 and the left eye may view a tilted zone 20 corresponding to the viewpoint 2. However, a rendered image of FIG. 2C is illustrated as one example, and the number of the plurality of views, a rendering pitch, and the like may be variously changed depending on an implementation.

The controller 140 may control an overall operation of the display device 100.

In particular, the controller 140 generates the multiview image to be displayed on the display 130 based on the sub-pixel values configuring the plurality of views having different viewpoints rendered by the renderer 120.

Specifically, the controller 140 may generate the multiview image by mapping a mixed pixel value in which a pixel value of a view of a specific viewpoint among the plurality of views having different viewpoints rendered by the renderer 120 and pixel values of views of adjacent viewpoints of the view of the specific viewpoint are mixed, to at least one target pixel zone. In this case, the controller 140 may generate the multiview image by calculate the mixed pixel value in one sub-pixel unit among R, G, and B, and mapping the calculated mixed pixel value to at least one target sub-pixel zone.

That is, unlike a conventional method in which the multiview image for an output is generated by mapping the sub-pixel value of a view of one viewpoint to the specific sub-pixel zone, the controller 140 may generate the multiview image to be output to the display 130 by mixing at least two sub-pixel values corresponding to views of at least two viewpoints and mapping the mixed sub-pixel value to the specific sub-pixel zone.

For example, when the controller 140 calculates the mixed pixel value to be mapped to the R sub-pixel of a position of (1, 1) of the multiview image to be displayed on the display 130, the controller 140 may calculate the mixed pixel value by mixing a value of the R sub-pixel of the position of (1, 1) of the view of a first viewpoint which is selected and a value of the R sub-pixel of the position of (1, 1) of a view of at least one adjacent viewpoint.

In this case, the controller 140 may calculate the mixed pixel value by selecting the view of the specific viewpoint to be mapped to the target pixel zone according to a predetermined reference, setting a source pixel zone corresponding to the target pixel zone from the view of the selected specific viewpoint and views of adjacent viewpoints of the view of the specific viewpoint, and then applying a predetermined weight to the set source pixel zone. Here, a plurality of views of the adjacent viewpoints of the view of the specific viewpoint may be associated with the calculating of the mixed pixel value.

For example, when a view of the viewpoint 2 is selected as a view to be mapped to the predetermined target sub-pixel zone of the multiview image among a total of views of 7 viewpoints, the controller 140 may calculate the mixed pixel value to be mapped to the target sub-pixel zone by applying the predetermined weight to the sub-pixel zones corresponding to the selected view of the viewpoint 2 and a view of a viewpoint 1 and a view of a viewpoint 3, which are views of adjacent viewpoints of the view of the viewpoint 2. Here, the predetermined weight may be applied in a form of Laplacian filter, Gaussian filter, Smoothing filter, and the like.

In addition, the controller 140 may set pixel zones including the pixel zone corresponding to the target pixel zone in the selected view of the specific viewpoint and the view of the adjacent viewpoint, and the pixel zones adjacent to the corresponding pixel zone, as the source pixel zone.

For example, when the controller 140 calculates the mixed pixel value to be mapped to the R sub-pixel of the position of (1, 1) of the multiview image to be displayed on the display 130, the controller 140 may calculate the mixed pixel value by applying the weight predetermined for the corresponding R sub-pixel zone to the R sub-pixel of the position of (1, 1) of the view of the first viewpoint which is selected as well as a pixel zone including an R sub-pixel of a position of (1, 2) and an R sub-pixel of a position of (2, 1), and views of a plurality of adjacent viewpoints, respectively.

In this case, the controller 140 may calculate the mixed pixel value by setting a 3D zone in an epipolar domain generated based on an epipolar image configured in the same pixel line of each of the plurality of rendered views, and applying a predetermined weight to the set 3D zone. That is, based on property of the epipolar domain, when the 3D zone is set on the basis of a specific sub-pixel zone of the view of the specific viewpoint selected from the epipolar domain, a zone including the source pixel zone corresponding to each of the view of the specific viewpoint and the view of the adjacent viewpoint may be set. A detailed description thereof will be described below with reference to the drawings.

The controller 140 may calculate the mixed pixel value to which the predetermined weight is applied by applying a predetermined filter to the 3D zone that is set in the epipolar domain. Here, the predetermined filter may be a form of bilinear interpolation, but is not limited thereto.

In addition, the controller 140 may generate the multiview image by setting the source pixel zone in each of a plurality of adjacent frames which are temporally adjacent to each other and mapping the source pixel zone to at least one target pixel zone. For example, the controller 140 may calculate the mixed pixel value by applying the predetermined weight to the 3D zone which is set by the above-mentioned method in each of the plurality of adjacent frames which are temporally adjacent to each other. That is, the controller 140 may calculate the mixed pixel value in consideration of pixel values of other adjacent frames such as a previous frame, a next frame, and the like, rather than simply based on a current frame, and the source pixel zone may be set according to various methods described above. In addition, the number of frames on which the calculation of the mixed pixel value is based may be variously considered.

Figure 3A:
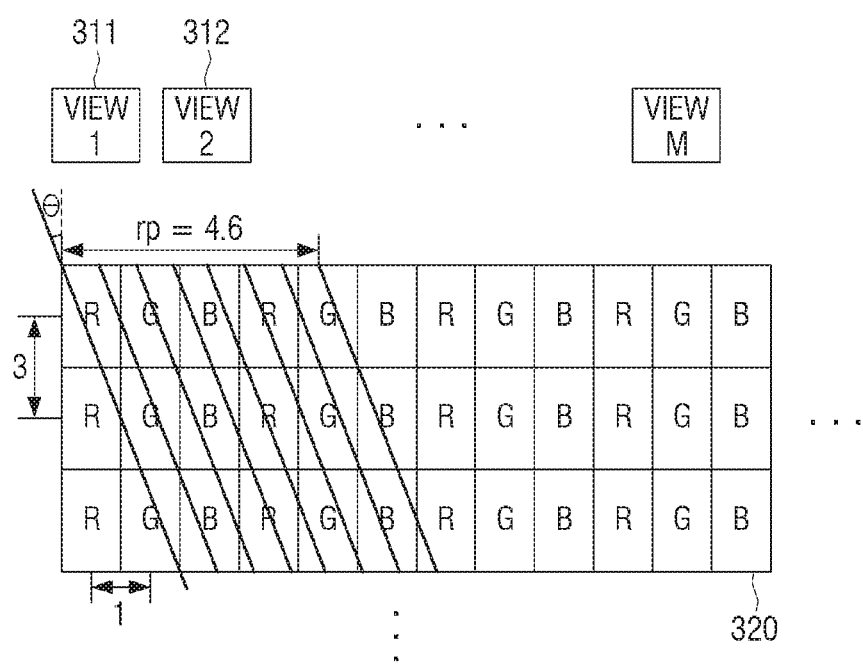
FIGS. 3A and 3B are diagrams illustrating a pixel mapping method according to an exemplary embodiment of the present disclosure.
Figure 3B:
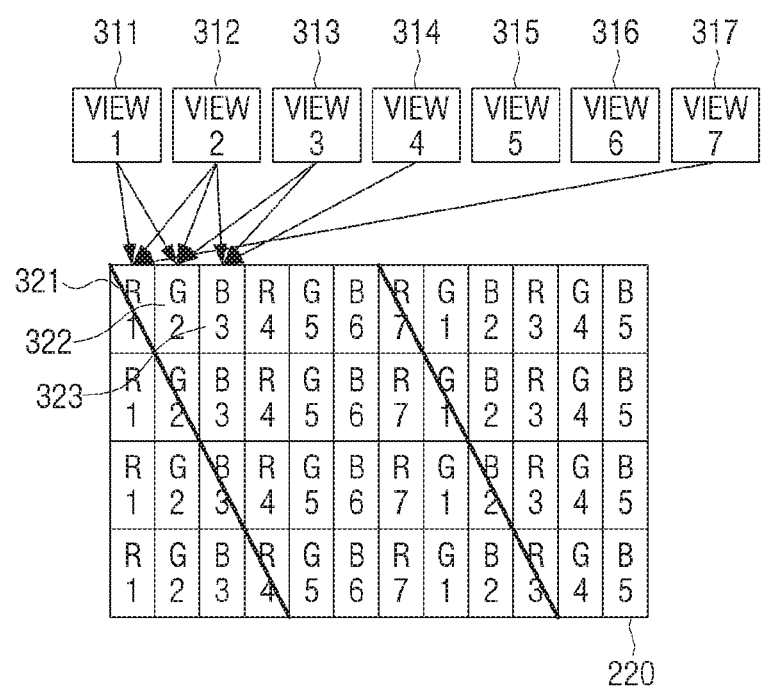

FIGS. 3A and 3B are diagrams illustrating a pixel mapping method according to an exemplary embodiment of the present disclosure.

FIG. 3A is a diagram illustrating a pixel mapping method according to an exemplary embodiment of the present disclosure.

According to an exemplary embodiment of the present disclosure, generating the multiview image for display from the plurality of views having different rendered viewpoints may be based on the number of the plurality of views and a pitch of the lenticular lens.

It is assumed for convenience of explanation in FIG. 3A that the number of the plurality of views 311, 312, . . . having different viewpoints is M, and the pitch of the lenticular lens covers 4.6 sub-pixels. In this case, a view assigned to a position of a pixel (i, j) may be calculated based on a method disclosed in the reference document "Cees van Derkel, "Image Preparation for 3D-LCD", Electronic Imaging '99".

FIG. 3B is a diagram illustrating a method for calculating a sub-pixel value according to an exemplary embodiment of the present disclosure.

FIG. 3B will describe a case in which the number of the plurality of views having different viewpoints is 7 (311 to 317) for convenience of explanation.

As illustrated in FIG. 3B, the sub-pixel value configuring the displayed multiview image 320 is not calculated based on one viewpoint image, but may be calculated based on the plurality of views having different viewpoints.

For example, when it is determined that a pixel value of the view of the viewpoint 1 is mapped to a first R sub-pixel 321, which is a first target pixel zone, a mixed pixel value to be mapped to the first R sub-pixel 321 may be calculated based on the pixel value of the view of the viewpoint 1 as well as the pixel values of the view of the viewpoint 2 and the view of the viewpoint 7, which are views of adjacent viewpoints.

In addition, when it is determined that the pixel value of the view of the view point 2 is mapped to a first G sub-pixel 322, which is a second target pixel zone, a mixed pixel value to be mapped to the first G sub-pixel 322 may be calculated based on the pixel value of the view of the viewpoint 2 as well as the pixel values of the view of the viewpoint 1 and the view of the viewpoint 3, which are views of adjacent viewpoints.

In addition, when it is determined that a pixel value of the view of the view point 3 is mapped to a first B sub-pixel 323, which is a third target pixel zone, a mixed pixel value to be mapped to the first B sub-pixel 323 may be calculated based on the pixel value of the view of the viewpoint 3 as well as the pixel values of the view of the viewpoint 2 and the view of the viewpoint 4, which are views of adjacent viewpoints.

In addition, the pixel mapping may be performed in the same manner for the remaining sub-pixel zones configuring the multiview image 320.

Hereinafter, a method for mapping a pixel value to a multiview output image will be described in detail with reference to the drawings.

Figure 4A:
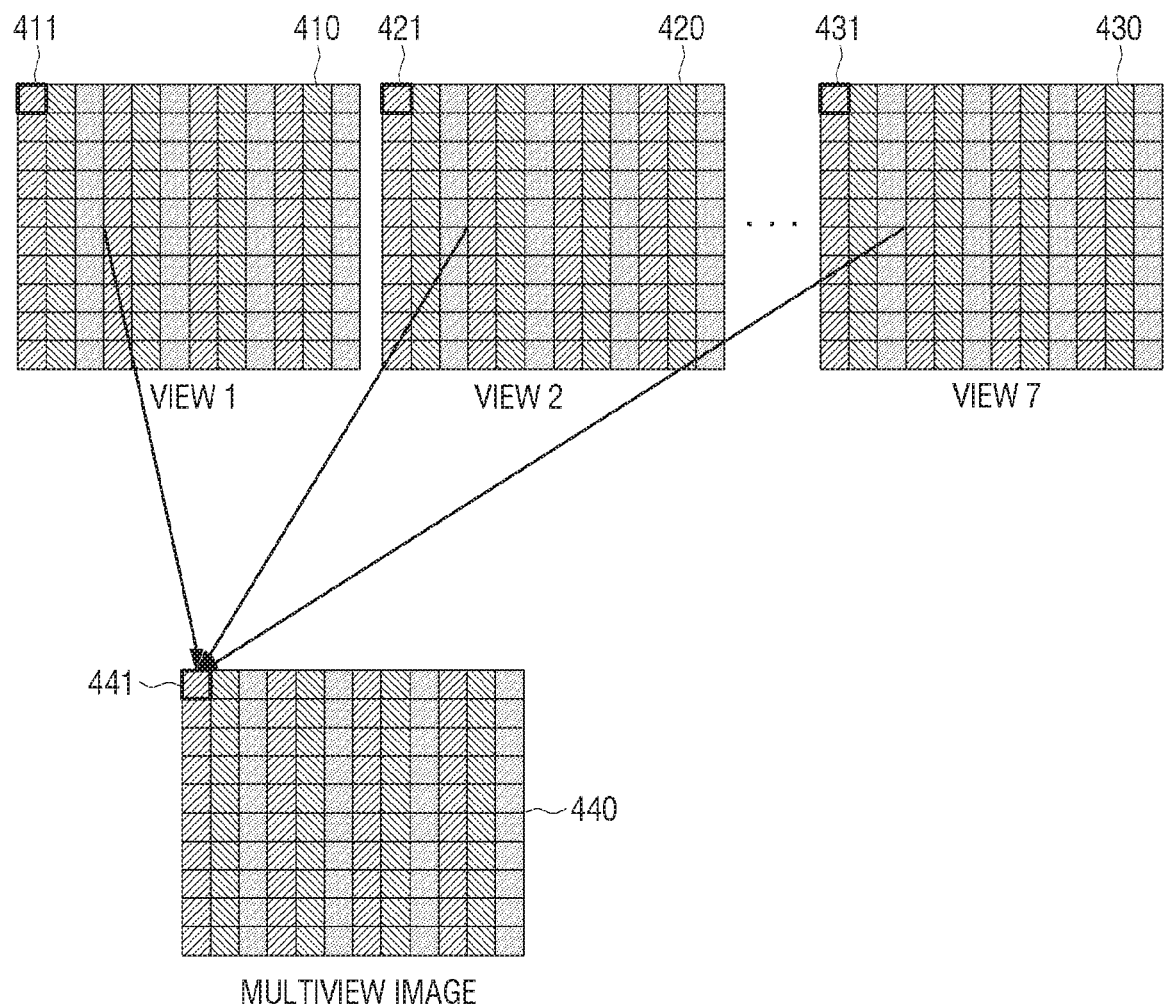
FIGS. 4A and 4B are diagrams illustrating pixel mapping methods according to diverse exemplary embodiments of the present disclosure in detail.
Figure 4B:
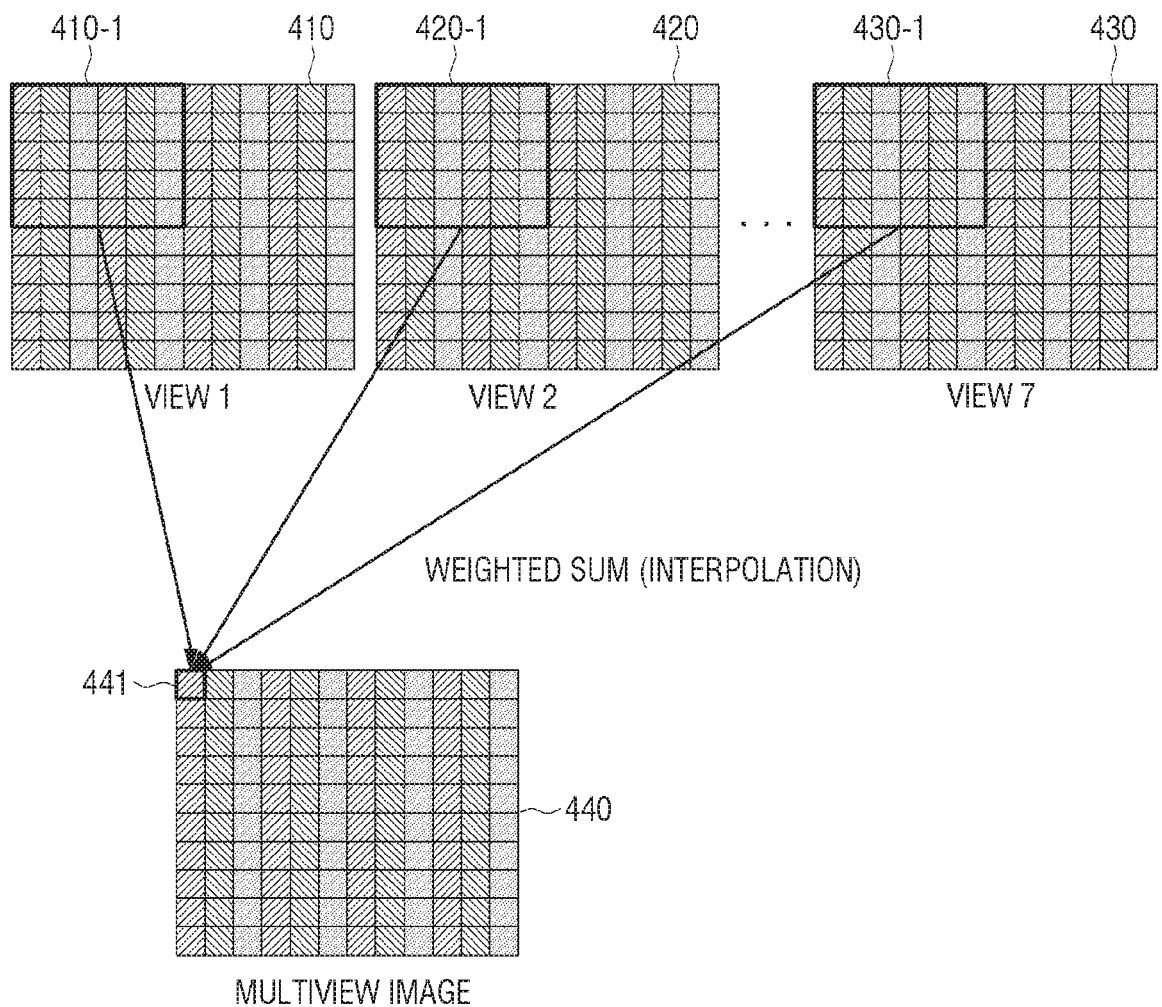

FIGS. 4A and 4B are diagrams illustrating pixel mapping methods according to diverse exemplary embodiments of the present disclosure in detail.

According to an exemplary embodiment of the present disclosure, when it is determined that a pixel value of a view 410 of a viewpoint 1 is mapped to a first R sub-pixel 441, which is a target pixel zone of a multiview output image 440, according to a predetermined reference (e.g., the above-mentioned reference document) as illustrated in FIG. 4A, a pixel value in which the pixel value of the view 410 of the viewpoint 1 as well as pixel values of a view 420 of a viewpoint 2 and a view 430 of a viewpoint 7, which are views of adjacent viewpoints, are mixed may be mapped to the first R sub-pixel 441 of the output image 440. That is, a pixel value in which a first R sub-pixel value 411 of the view 410 of the viewpoint 1, a first R sub-pixel value 421 of the view 420 of the viewpoint 2, and a first R sub-pixel value 431 of the view 430 of the viewpoint 7 are mixed according to a predetermined weight is mapped to the first R sub-pixel 441.

In addition, according to another exemplary embodiment of the present disclosure, when it is determined that the pixel value of the view 410 of the viewpoint 1 is mapped to the first R sub-pixel 441 of the output image 440 according to a predetermined reference (e.g., Mathematical expression 1) as illustrated in FIG. 4B, a mixed pixel value may be calculated based on a specific sub-pixel value of the view 410 of the viewpoint 1 as well as pixel zones 420-1 and 430-1 corresponding to the view 420 of the viewpoint 2 and the view 430 of the viewpoint 7, which are the views of the adjacent viewpoints, based on a pixel zone 410-1 including the specific sub-pixel and the adjacent sub-pixel. That is, a pixel value in which R pixel values of a specific R sub-pixel zone 410-1 of the view 410 of the viewpoint 1, a specific R sub-pixel zone 420-1 of the view 420 of the viewpoint 2, and a specific R sub-pixel zone 430-1 of the view 430 of the viewpoint 7 are mixed according to a predetermined weight is mapped to the first R sub-pixel 441.

FIGS. 5A to 5D are diagrams illustrating a pixel mapping method using an epipolar domain according to an exemplary embodiment of the present disclosure.

Figure 5A:
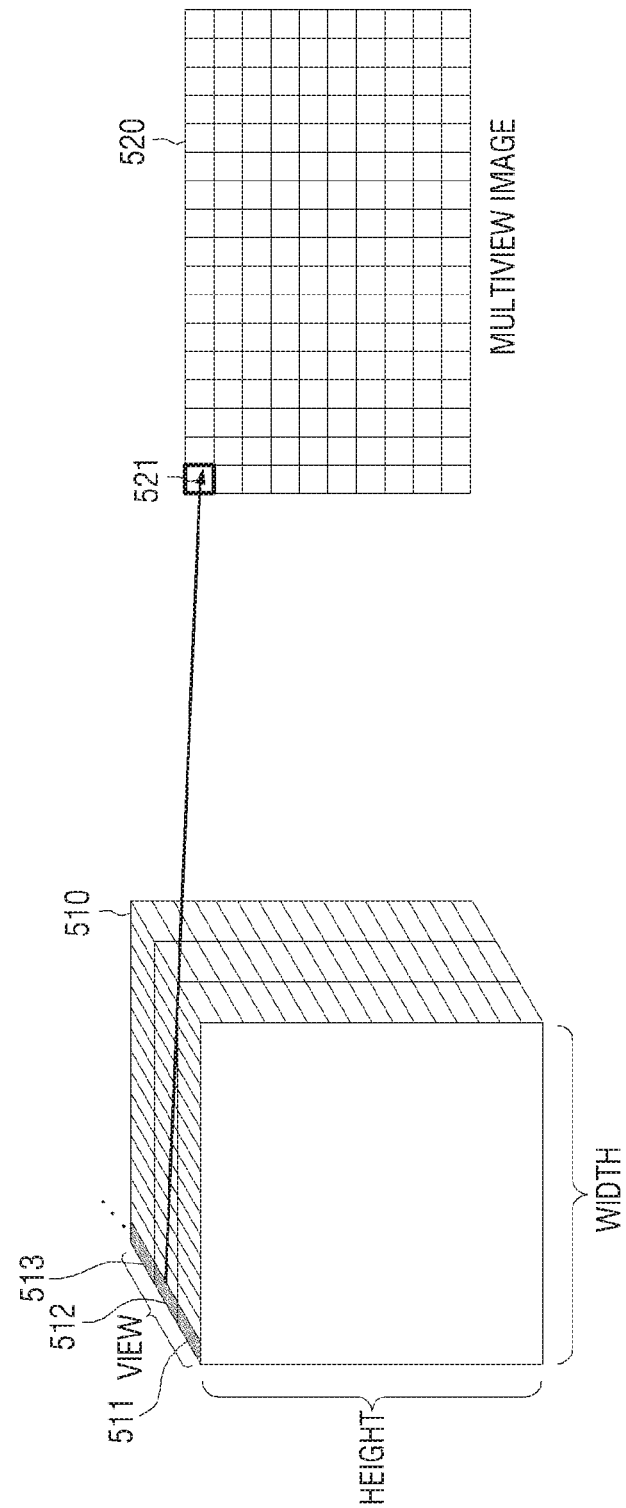

As illustrated in FIG. 5A, an epipolar domain 510 may have a form in which each of the plurality of views having different rendered viewpoints is arranged in a Y axis (a view axis), and a width and a height of each of the views configure a X-Z axis (width axis-height axis). That is, an image in which the same pixel lines in each of the plurality of views are combined may configure the X-Y axis, that is, the width-height axis. For example, the same pixel lines in each of the plurality of views may configure the Y axis, that is, the view axis.

Meanwhile, according to an exemplary embodiment of the present disclosure, when it is determined that a value of a first sub-pixel 512 of the specific view is mapped to a target sub-pixel zone, for example, a first sub-pixel 521, of a multiview image 520 to be output as illustrated in FIG. 5A, a mixed pixel value in which a pixel value of the first sub-pixel 512 and pixel values of first sub-pixels 511 and 513 of adjacent views are mixed according to a predetermined weight may be mapped to the first sub-pixel 521 of the multiview image 520 to be output. In this case, the mixed pixel value may be calculated by setting a 2D zone including the corresponding sub-pixels 511, 512, and 513 in the epipolar domain 510, and applying the predetermined weight filter to the set 2D zone.

Figure 5B:
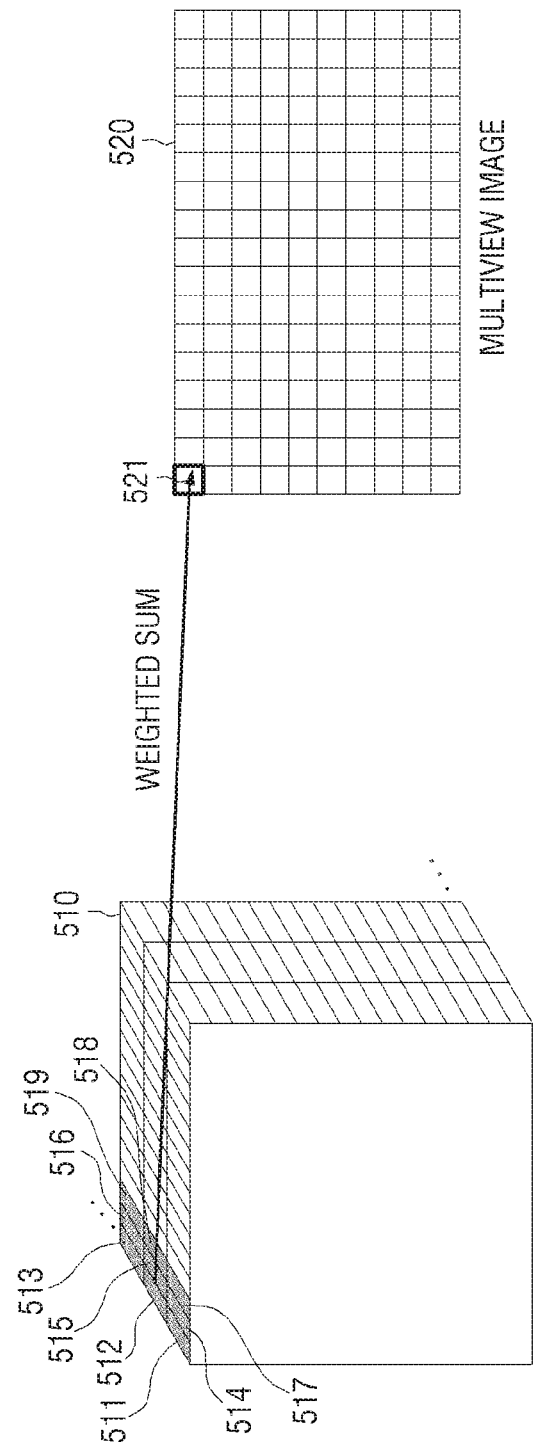
Figure 5C:
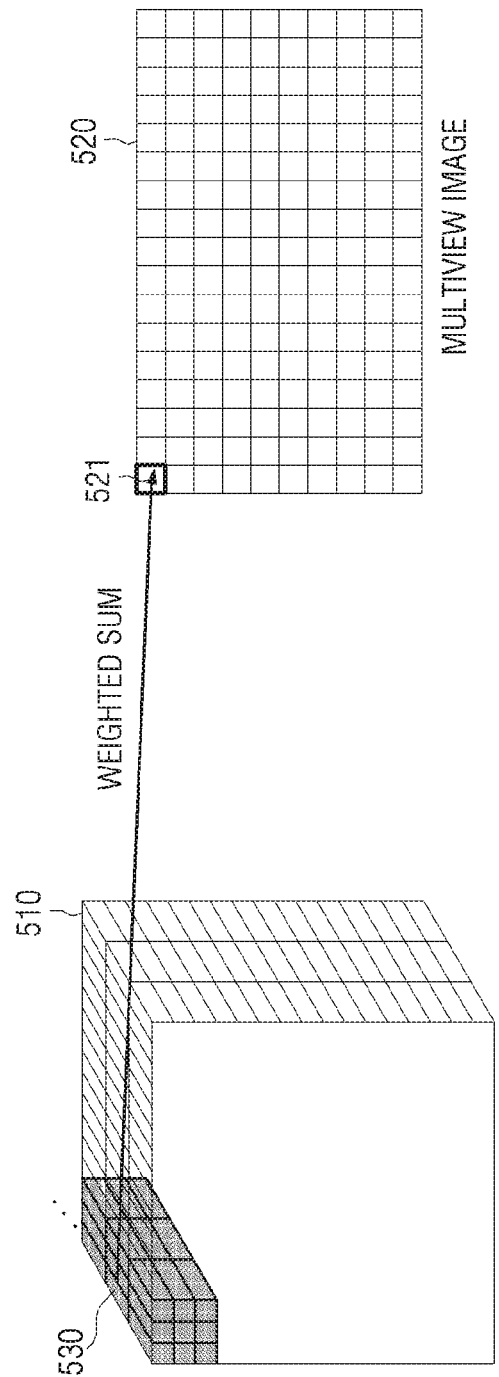

In addition, according to another exemplary embodiment of the present disclosure, the mixed pixel value may also be calculated based on sub-pixel values of corresponding sub-pixel zones in a reference view and an adjacent view, as well as sub-pixel values of adjacent sub-pixel zones in a horizontal direction in each view as illustrated in FIG. 5B. In this case, the mixed pixel value may be calculated by setting a 2D zone including corresponding sub-pixels 511, 512, and 513, and adjacent pixels 514 to 519 in a horizontal direction of the R sub-pixels 511, 512, and 513 in the epipolar domain 510, and applying a predetermined weight filter to the set 2D zone.

In addition, according to still another exemplary embodiment of the present disclosure, the mixed pixel value may also be calculated based on the sub-pixel values of the corresponding sub-pixel zones in the reference view and the adjacent view, as well as sub-pixel values of adjacent sub-pixel zones in horizontal and vertical directions in each view. In this case, the mixed pixel value may be calculated by setting a 3D zone including the corresponding sub-pixels 511, 512, and 513, and adjacent pixels 514 to 519 in the horizontal and vertical directions of the R sub-pixels 511, 512, and 513 in the epipolar domain 510, and applying a predetermined weight filter to the set 3D zone.

In addition, according to still another exemplary embodiment of the present disclosure, the mixed pixel value may be calculated based on a pixel value of a current frame, as well as pixel values of other frames which are temporally adjacent to each other, as illustrated in FIG. 5D. In this case, for example, the mixed pixel value may be calculated by setting 3D zones 530, 540, and 550 including corresponding sub-pixels and adjacent pixels in at least one of the horizontal and vertical directions of the corresponding sub-pixels in each of 2k+1 adjacent frames, and applying a predetermined weight filter to the 3D zones set in each frame.

Figure 6A:
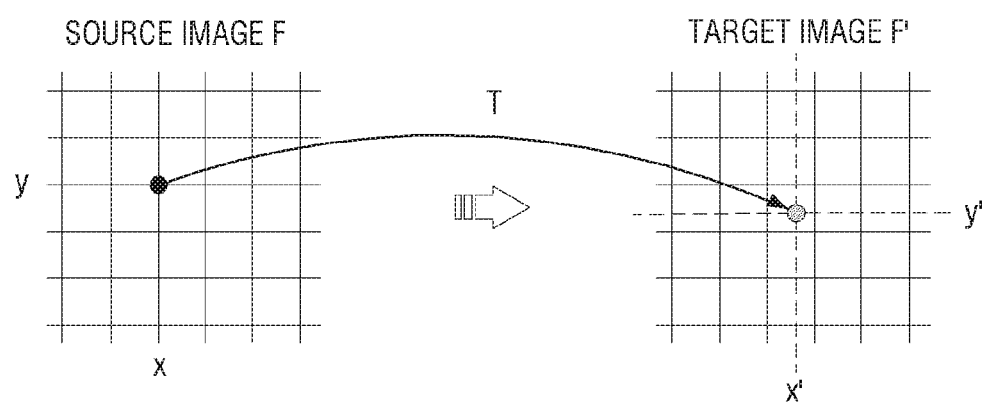
FIGS. 6A and 6B are diagrams illustrating an interpolation method according to an exemplary embodiment of the present disclosure.
Figure 6B:
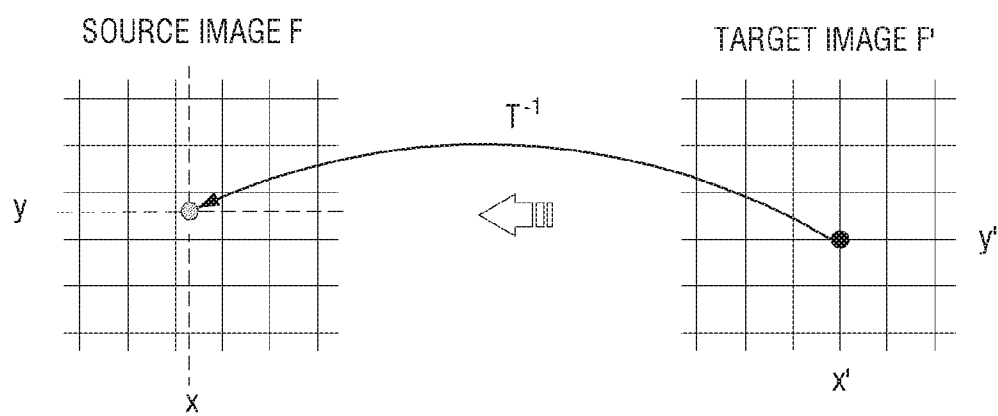

FIGS. 6A and 6B are diagrams illustrating an interpolation method according to an exemplary embodiment of the present disclosure.

FIG. 6A illustrates a forward mapping (or a source-to-target mapping) according to an exemplary embodiment of the present disclosure, in which new coordinates for all pixels of the received image may be calculated, and the pixel value may be copied to a new position. For example, a corresponding target position may be calculated from the output image by applying a geometry transformation T to a position of each pixel in the received image as illustrated. In general, a target position (x', y') is not a separate raster point, and the pixel value in the received image may be copied to one of adjacent target pixels.

FIG. 6B illustrates a backward mapping (or a target-to-source mapping) according to another exemplary embodiment of the present disclosure, in which continuous positions in the received image may be calculated by applying a corresponding inverse mapping function $T^{-1}$ to the position of each pixel in the output image. A new pixel value may be calculated by interpolation in adjacent pixels of (x, y) in the received image.

Using the interpolation as illustrated in FIGS. 6A and 6B, it is possible to calculate the new pixel value even in the case in which a resolution of the image and a resolution of a display are different.

Figure 7A:
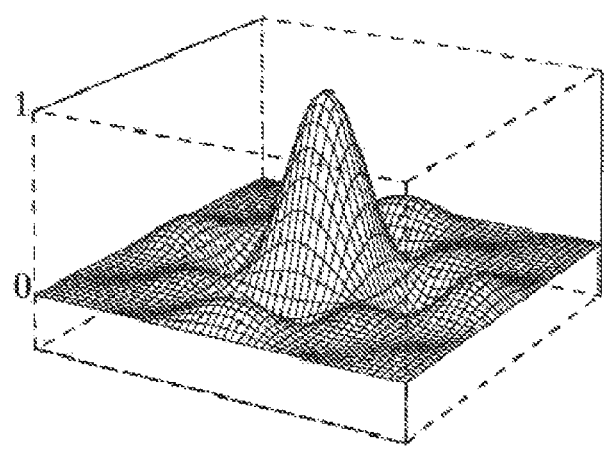
FIGS. 7A and 7B are diagrams illustrating an interpolation type according to an exemplary embodiment of the present disclosure.
Figure 7B:
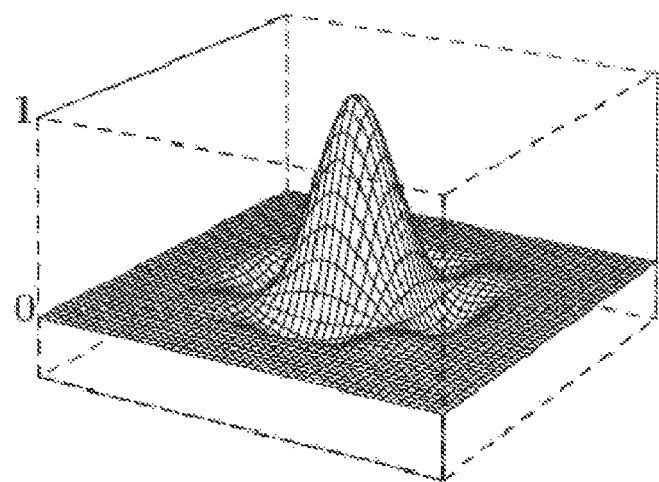

FIGS. 7A and 7B are diagrams illustrating an interpolation type according to an exemplary embodiment of the present disclosure.

According to an exemplary embodiment of the present disclosure, a bilinear interpolation may be applied to the zone set to perform the sub-pixel mapping in the epipolar domain.

For example, the mixed pixel value may be calculated by performing the bilinear interpolation using the function as illustrated in FIGS. 7A and 7B, but is not limited thereto.

Figure 8:
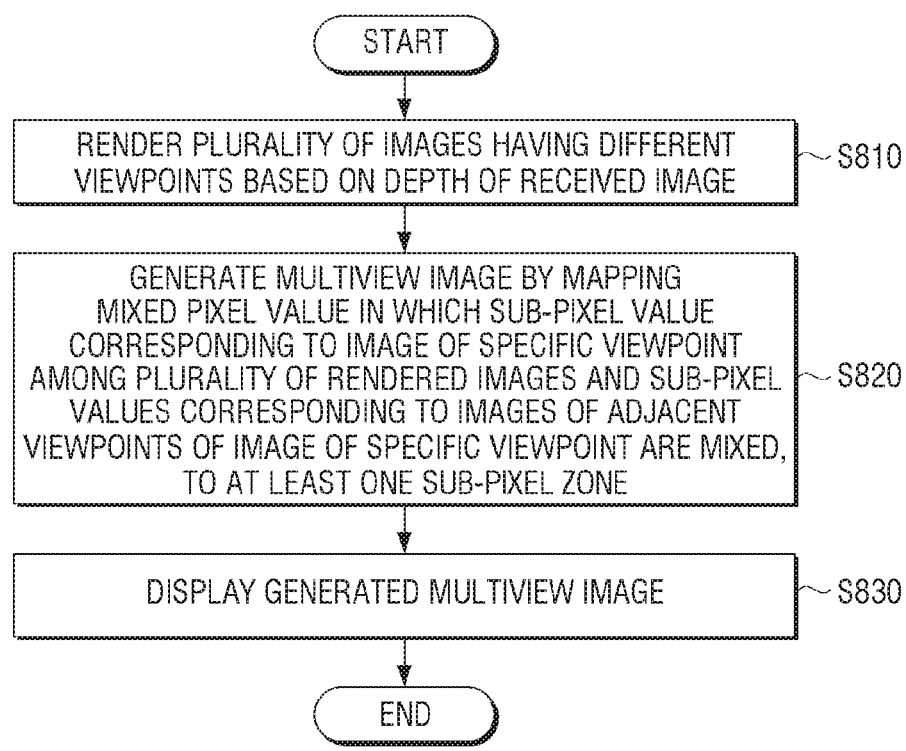
FIG. 8 is a flowchart illustrating a control method of a multiview image display device according to an exemplary embodiment of the present disclosure.

FIG. 8 is a flowchart illustrating a control method of a multiview image display device according to an exemplary embodiment of the present disclosure.

According to the control method of a multiview image display device illustrated in FIG. 8, first, a plurality of views having different viewpoints are rendered based on a depth of a received image (S810).

Next, a multiview image is generated based on pixel values configuring the plurality of rendered views (S820). In this case, in S820, the multiview image may be generated by mapping a mixed pixel value generated based on a pixel value of a view of a specific viewpoint among the plurality of rendered views and pixel values of views of adjacent viewpoints of the view of the specific viewpoint, to at least one target pixel zone. In this case, the mixed pixel value may be calculated in one sub-pixel unit among R, G, and B.

Next, the generated multiview image is displayed (S830).

Here, the display device includes the display panel for displaying the multiview image, and a visual field separator disposed in the front surface of the display panel and providing optical views having different viewpoints in the viewing zone of the user, and the number of the plurality of views used to generate the multiview image in S820 may be greater than the number of the optical views provided in the viewing zone of the user.

In addition, in S820 of generating the multiview image, the mixed pixel value may be calculated by selecting a view of a specific viewpoint to be mapped to the target pixel zone according to a predetermined reference, setting a source pixel zone corresponding to the target pixel zone from the selected view of the specific viewpoint and views of adjacent viewpoints of the view of the specific viewpoint, and then applying a predetermined weight to the set source pixel zone. Here, the views of the adjacent viewpoints of the view of the specific viewpoint used to calculate the mixed pixel value may include a view of a previous viewpoint and a view of a next viewpoint of the view of the specific viewpoint.

In addition, in S820 of generating the multiview image, pixel zones including the pixel zone corresponding to the target pixel zone in the selected view of the specific viewpoint and the views of the adjacent viewpoints and adjacent pixel zones of the corresponding pixel zone may be set as the source pixel zone.

In addition, in S820 of generating the multiview image, the mixed pixel value may be calculated by setting the 3D zone including a source pixel zone corresponding to each of the selected view of the specific viewpoint and the views of the adjacent viewpoints in the epipolar domain generated based on the epipolar image configured by the same pixel line of each of the plurality of views, and applying a predetermined weight to the set 3D zone.

In this case, in S820 of generating the multiview image, the mixed pixel value to which the predetermined weight is applied may be calculated by applying a predetermined filter to the 3D zone that is set in the epipolar domain. Here, the predetermined filter may be a bilinear interpolation filter.

In addition, in S820 of generating the multiview image, the mixed pixel value may be calculated by applying a predetermined weight to the 3D zone set in each of a plurality of adjacent frames which are temporally adjacent.

According to the diverse exemplary embodiments of the present disclosure as described above, the multiview image generated based on the received view images greater than the number of the optical views provided in the viewing zone of the user is mapped to the display, thereby making it possible to provide a smooth view transition and to remove angular aliasing caused by quantization error. Accordingly, a clear 3D image may be serviced to the user.

The multiview image display method according to diverse exemplary embodiments described above may be implemented in a program to be provided to the display device.

As an example, a non-transitory computer readable medium having a program stored thereon may be provided, in which the program performs an operation of rendering a plurality of views having different viewpoints based on a depth of a received image, and an operation of generating a multiview image by mapping a mixed pixel value generated based on a pixel value of a view of a specific viewpoint among the plurality of rendered views and pixel values of views of adjacent viewpoints of the view of the specific viewpoint, to at least one target pixel zone.

The non-transitory computer readable medium does not mean a medium that stores data for a short period such as a register, a cache, a memory, or the like, but means a machine readable medium that semi-permanently stores the data. Specifically, various applications or programs described above may be stored and provided in the non-transitory computer readable medium such as a compact disc (CD), a digital versatile disk (DVD), a hard disk, a Blu-ray disk, a universal serial bus (USB), a memory card, a read-only memory (ROM), or the like.

Hereinabove, although the exemplary embodiments of the present disclosure have been shown and described, it should be understood that the present disclosure is not limited to the disclosed embodiments and may be variously changed without departing from the spirit and the scope of the present disclosure. Therefore, the present disclosure should be construed as including all the changes, equivalents, and substitutions included in the spirit and scope of the present disclosure.

What is claimed is:

1. A multiview image display device, comprising:
an image receiver receiving an image;
a renderer rendering a plurality of views based on depth information of the received image;
a display displaying a multiview image; and
a controller generating the multiview image by mapping a mixed pixel value obtained based on: i) a first pixel value of a first view of a specific viewpoint among the plurality of views, ii) a second pixel value of a second view of an adjacent viewpoint of the plurality of views, and iii) a third pixel value of a third view separated by at least two viewpoints from the specific viewpoint to at least one target pixel zone, wherein the first pixel value and the second pixel value both correspond to a same color.

2. The multiview image display device as claimed in claim 1, wherein the display includes:
a display panel displaying the multiview image, and
a visual field separator disposed in a front surface of the display panel and providing optical views in a viewing zone of a user, wherein an optical view is a position at which an image is formed, and
the number of the plurality of views used to generate the multiview image is greater than the number of the optical views.

3. The multiview image display device as claimed in claim 1, wherein the controller calculates the mixed pixel value by selecting a view of the specific viewpoint to be mapped to the at least one target pixel zone according to a predetermined reference, setting a source pixel zone corresponding to the at least one target pixel zone in the selected view of the specific viewpoint and the views of adjacent viewpoints of the view of the specific viewpoint, and then applying a predetermined weight to the set source pixel zone.

4. The multiview image display device as claimed in claim 3, wherein the controller sets a pixel zone including a pixel zone corresponding to the at least one target pixel zone in the selected view of the specific viewpoint and the views of the adjacent viewpoints and adjacent pixel zones of the pixel zone, as the source pixel zone.

5. The multiview image display device as claimed in claim 4, wherein the controller calculates the mixed pixel value by setting a three-dimensional (3D) zone including the source pixel zone corresponding to each of the selected view of the specific viewpoint and the views of the adjacent viewpoints in an epipolar domain generated based on an epipolar image configured by the same pixel line of each of the plurality of views, and applying a predetermined weight to the set 3D zone.

6. The multiview image display device as claimed in claim 5, wherein the controller calculates the mixed pixel value to which the predetermined weight is applied by applying a predetermined filter to the 3D zone.

7. The multiview image display device as claimed in claim 6, wherein the predetermined filter is a bilinear interpolation filter.

8. The multiview image display device as claimed in claim 5, wherein the controller calculates the mixed pixel value by applying the predetermined weight to the 3D zone set in each of a plurality of adjacent frames which are temporally adjacent to each other.

9. The multiview image display device as claimed in claim 1, wherein the views of the adjacent viewpoints of the view of the specific viewpoint used to calculate the mixed pixel value include a view of a previous viewpoint and a view of a next viewpoint of the view of the specific viewpoint.

10. The multiview image display device as claimed in claim 1, wherein the controller calculates the mixed pixel value in one sub-pixel unit among red (R), green (G), and blue (B).

11. A control method of a multiview image display device, the control method comprising:
- rendering a plurality of views based on depth information of a received image;
- generating a multiview image; and
- displaying the generated multiview image,
- wherein the generating of the multiview image includes generating the multiview image by mapping a mixed pixel value obtained based on: i) a first pixel value of a first view of a specific viewpoint among the plurality of views, ii) a second pixel value of a second view of an adjacent viewpoint of the plurality of views, and iii) a third pixel value of a third view separated by at least two viewpoints from the specific viewpoint to at least one target pixel zone, wherein the first pixel value and the second pixel value both correspond to a same color.

12. The control method as claimed in claim 11, wherein the multiview image display device includes:
- a display panel displaying the multiview image, and
- a visual field separator disposed in a front surface of the display panel and providing optical views of different viewpoints in a viewing zone of a user, and the number of the plurality of views used to generate the multiview image is greater than the number of the optical views.

13. The control method as claimed in claim 11, wherein in the generating of the multiview image, the mixed pixel value is calculated by selecting the view of the specific viewpoint to be mapped to the at least one target pixel zone according to a predetermined reference, setting a source pixel zone corresponding to the at least one target pixel zone in the selected view of the specific viewpoint and the views of adjacent viewpoints of the view of the specific viewpoint, and then applying a predetermined weight to the set source pixel zone.

14. The control method as claimed in claim 13, wherein in the generating of the multiview image, a pixel zone including a pixel zone corresponding to the at least one target pixel zone in the selected view of the specific viewpoint and the views of the adjacent viewpoints and adjacent pixel zones of the pixel zone is set as the source pixel zone.

15. The control method as claimed in claim 14, wherein in the generating of the multiview image, the mixed pixel value is calculated by setting a three-dimensional (3D) zone including the source pixel zone corresponding to each of the selected view of the specific viewpoint and the views of the adjacent viewpoints in an epipolar domain generated based on an epipolar image configured by the same pixel line of each of the plurality of views, and applying a predetermined weight to the set 3D zone.

* * * * *